Oct. 16, 1934.  T. W. BYRNE  1,976,919
METHOD OF MAKING GROUND TERMINALS
Filed May 7, 1931
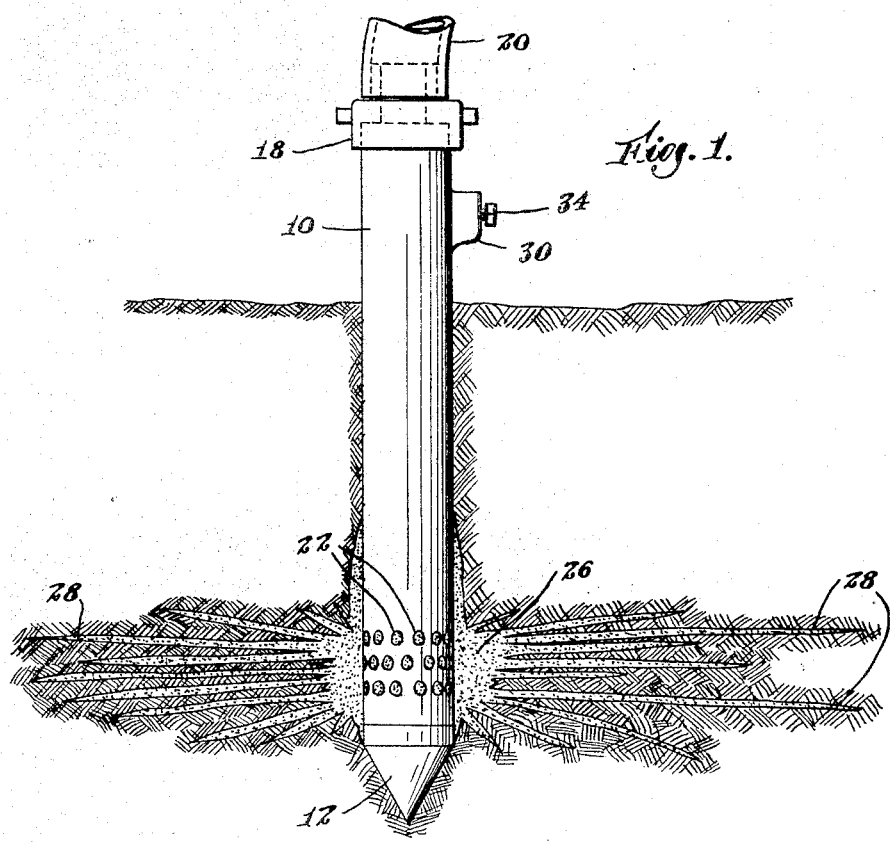
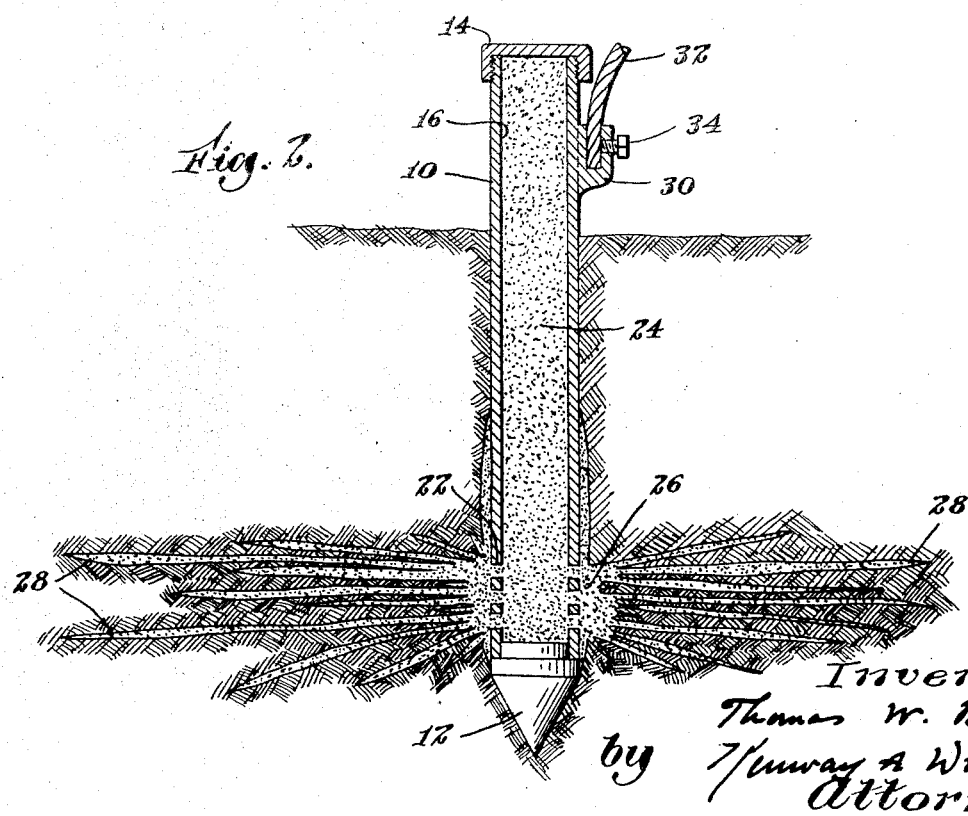
Inventor
Thomas W. Byrne
by Munway A Witter
Attorneys Patented Oct. 16, 1934

1,976,919

UNITED STATES PATENT OFFICE 1,976,919

METHOD OF MAKING GROUND TERMINALS

Thomas William Byrne, Boston, Mass., assignor to Godfrey L. Cabot, Inc., Boston, Mass., a corporation of Massachusetts Application May 7, 1931, Serial No. 535,616

5 Claims. (Cl. 173—31)

This invention relates to a method of making ground terminals for use in connection with electrical circuits and installations where it is important to produce a terminal of permanent character and low external resistance.

The present practice is to drive into the earth a spike, preferably copper-plated, and to rely upon this as a ground terminal. In many cases, however, particularly in dry and gravelly soils, it is difficult to secure in this manner a terminal having sufficiently low resistance between itself and the surrounding soil. Moreover, such a terminal is subject to variations in resistance in accordance with the seasons of the year and the precipitation over different periods. There are, moreover, locations in which it is inconvenient or impossible to drive a terminal spike and, for the reasons above discussed, there has long been an outstanding problem not heretofore satisfactorily solved.

I have discovered that by injecting below the surface of the earth an electro-conductive plastic material, adapted to be molded during the process of injection into a permanent body making intimate contact with the surrounding earth, it is possible to produce ground terminals in a mechanically practical manner and with an electrical resistance uniformly lower than by methods heretofore practiced. The particular material I prefer to employ is a carbonaceous paste which may be formed from the carbon black of commerce. When this is diluted with water or other liquid, it forms an insoluble paste which may be conducted below the surface of the earth by a suitable pipe and then forced from the pipe into the cavities and seams of the earth surrounding the pipe and into the space adjacent to the pipe both above and below the vents or outlet openings therein. The injected material, therefore, forms an irregular body of appreciable size which remains in intimate contact with the earth over a large superficial area of contact. It is, moreover, permanent in character since it is insoluble, and thus a substantially unvarying electrical contact is insured between the ground terminal and the surrounding earth.

The characteristics and advantages of my novel method will be best understood and appreciated from the following description of one preferred manner of practicing the invention in connection with the accompanying drawing, wherein Fig. 1 is a sectional view through a portion of earth and showing a ground terminal being formed in accordance with my invention; and Fig. 2 is a like view showing the completed terminal in longitudinal section.

In proceeding with the practice of my improved method, I form a channel or bore to a proper depth into the earth and conduct the terminal-forming material in its plastic state downwardly therethorugh and through the fissures diverging therefrom into intimate contact with the earth, the upper end of the terminal projecting above the earth's surface and providing for connecting contact therewith. This channel can best be provided by a suitable pipe or drill having a central bore for receiving and conducting the plastic material into the earth and for protecting the material and combining therewith to form the conducting element. I have illustrated such a device in the accompanying drawing and will now proceed to define the practice of my invention by reference thereto.

The pipe-like element 10, which may be made of any suitable electro-conductive material of a permanent nature, has provided on its lower end a hardened head 12 whereby the device can be driven into the ground. While the length of the pipe and the extent to which it is driven into the earth will depend on the character of the soil, it should be driven far enough to bring its lower end well beneath the surface. A cap 14 may be threaded onto the pipe to protect its outer end in the driving operation and this same cap may thereafter serve the purpose of closing the outer end of the bore 16. When the pipe is in place, the cap 14 is removed and a cap 18 is substituted therefor, which latter cap has a hose connection 20.

The material which I use in forming my improved ground terminal is of a carbonaceous nature and is injected or applied in a plastic or paste-like form. This carbonaceous paste may be formed from commercial carbon black by diluting it with water or other suitable liquid, the carbon being insoluble in the liquid, which merely acts as a vehicle. The paste thus prepared is forced under pressure through the hose connection 20 into the pipe 10 and a portion thereof passes radially outwardly through openings 22 at the bottom end of the pipe. The pressure causes the paste to pack very compactly within the pipe at 24 and to form a like compact body portion 26 integral therewith and surrounding the pipe adjacent to and extending through the holes 22. The pressure also causes the paste forming the body portion 26 to be forced outwardly through the fissures and cavities in the earth to form a plurality of relatively long branches 28 all radiating from and integral with the material 26 and 24. There is thus formed an integral body of appreciable size and irregular shape in contact with the earth over a relatively large superficial area. The body thus formed is compact at all points. It extends upwardly in intimate contact with the sides of the pipe 10 making a firm connection between the pipe and the surrounding soil. The carbonaceous material is, furthermore, of a non-soluble and permanent character and thereby insures a substantially unvarying electrical contact between the ground terminal and the earth.

In most cases the natural cavities and seams of the earth will be sufficient in extent and capacity to receive an adequate volume of electroconductive plastic material, but if desired the soil may be prepared by use of an explosive prior to the injecting step or the material may be bombarded from a point of injection into the surrounding soil and an integral body formed by successive injecting steps.

When the injecting operation above described is completed, the cap 18 is removed and the cap 14 replaced on the pipe. A ground wire connection 30 may be provided on and integral with the pipe whereby the conductor 32 may be connected thereto as by a screw 34.

I am aware that attempts have been made heretofore to improve the contact between a driven pipe and the earth by allowing a liquid solution of metallic salts to flow from buried outlets therein, but such procedure does not result in a body of permanent character such as that created by carrying out the method of my invention and is not comprehended within its scope.

Having thus described my invention, what I claim as new and desire to secure by Letters Patent is:

1. The method of making ground terminals, which is characterized by injecting through the surface of the earth a carbonaceous paste adapted to flow into and completely fill the natural cavities in the earth and form a unitary conductive body of irregular shape and large superficial area.

2. The method of making ground terminals, which is characterized by injecting through the surface of the earth a liquid or semi-liquid carbon black mixture adapted to flow into and completely fill the natural cavities in the earth and form a unitary conductive body of irregular shape and large superficial area.

3. The method of making ground terminals, which is characterized by the steps of conducting a carbonaceous paste vertically to a point beneath the surface of the earth, and then forcing it laterally into the adjacent seams and cavities thereof to form a unitary conductive body maintaining intimate contact with the earth which bounds it.

4. The method of making ground terminals, which is characterized by injecting a carbonaceous material beneath the surface of the earth, bombarding it into the surrounding soil by a sub-soil explosion, and then, by a further injecting step, completing an integral body of said material.

5. A ground terminal comprising an upright pipe having an opening near its lower end, a ground wire connection, and a filling of semi-liquid carbon black mixture extending out through said opening and molded into an insoluble body of irregular shape in intimate contact with the exterior of said pipe.

THOMAS WILLIAM BYRNE.